United States Patent [19]
Burdick et al.

[11] 3,796,162
[45] Mar. 12, 1974

[54] CONVEYOR SYSTEM

[75] Inventors: Robert E. Burdick; Henry W. Huthsing; Robert B. Kieding, all of Santa Barbara, Calif.

[73] Assignee: Rolair Systems, Inc., Santa Barbara, Calif.

[22] Filed: June 28, 1972

[21] Appl. No.: 267,188

[52] U.S. Cl. ............................. 104/23 FS, 180/116
[51] Int. Cl. ............................................. B61b 13/08
[58] Field of Search .......... 104/23 FS, 134, 148 MS, 104/148 SS; 180/116, 125, 127, 128

[56] References Cited
UNITED STATES PATENTS

| | | | |
|---|---|---|---|
| 3,513,934 | 5/1970 | Crowley | 104/23 FS |
| 3,233,559 | 2/1966 | Smith | 104/23 FS |
| 3,368,496 | 7/1968 | Falk | 104/23 FS |
| 3,650,218 | 3/1972 | Losey | 104/134 |

*Primary Examiner*—Gerald M. Forlenza
*Assistant Examiner*—D. W. Keen
*Attorney, Agent, or Firm*—Harris, Kern, Wallen & Tinsley

[57] ABSTRACT

A conveyor system for moving large objects, such as mobile homes, along a production line or the like. A pair of tracks laid on the factory floor, comprising plates with upstanding rails. Load carriers for movement along the tracks, each load carrier comprising a platform with guide members for engaging the rails and a frame with a plurality of removable air cushion units.

13 Claims, 8 Drawing Figures

PATENTED MAR 12 1974 3,796,162

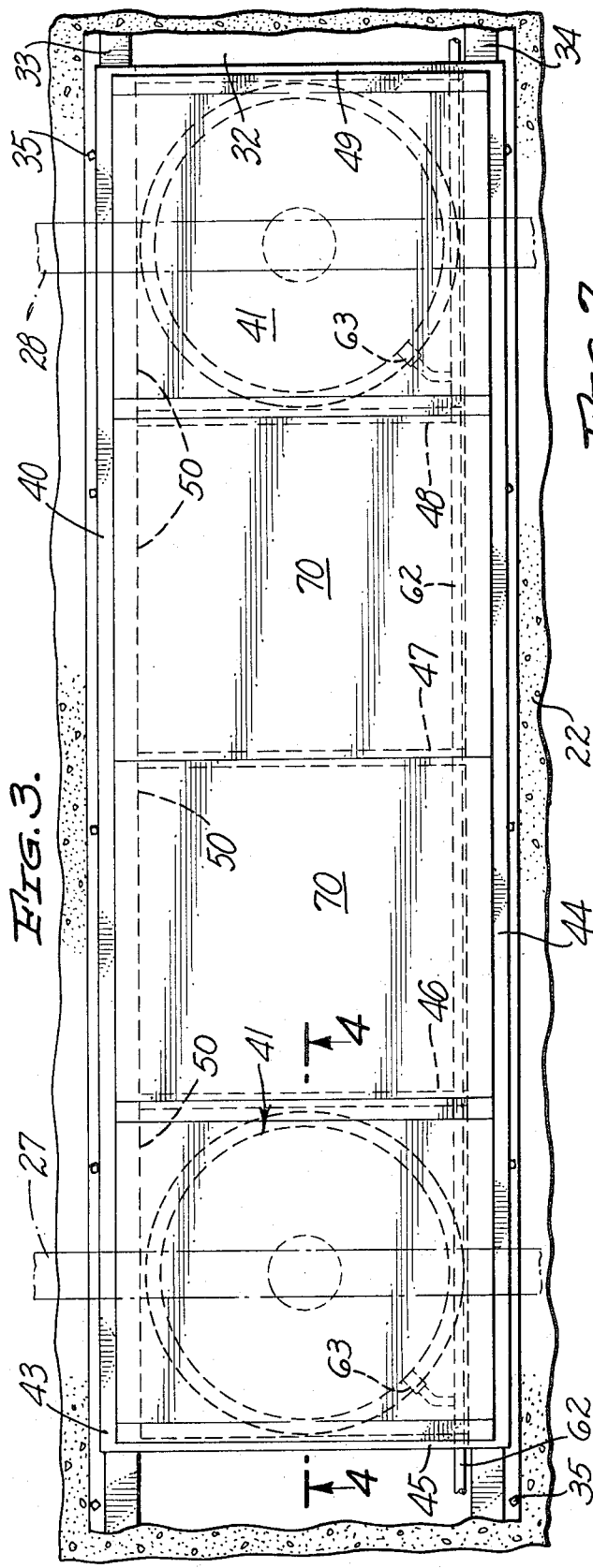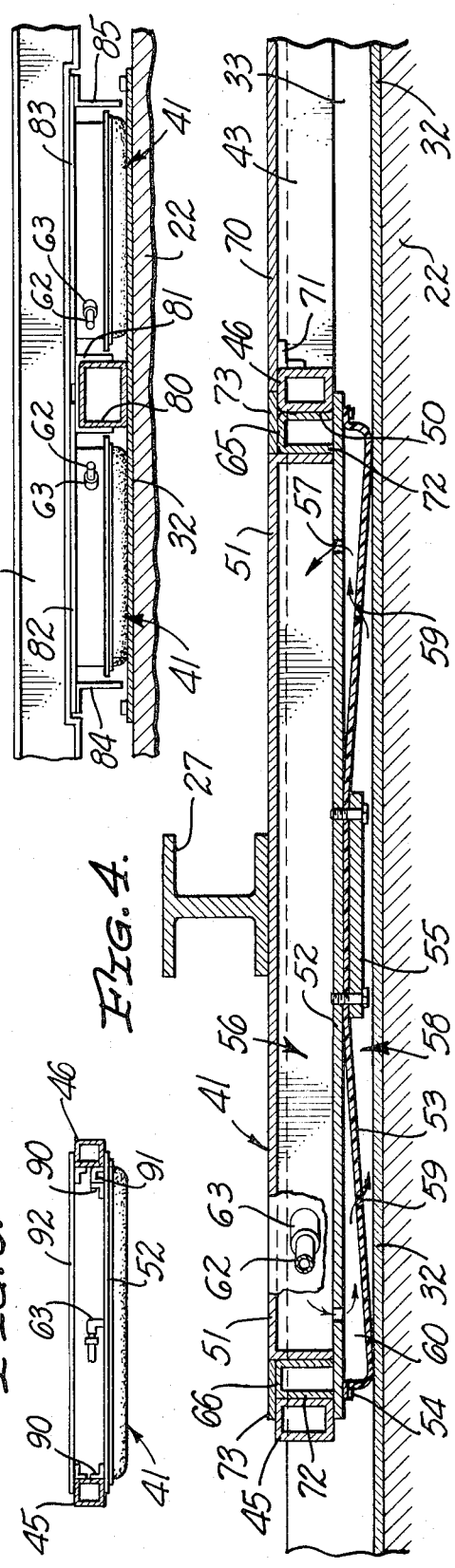

CONVEYOR SYSTEM

This invention relates to conveyor systems utilizing air cushion units for lifting a load from a floor or other supporting surface and permitting horizontal movement of the load on an air film. More specifically, the invention is directed to a new and improved conveyor system suitable for moving large loads, such as the movement of mobile homes along an assembly line. A typical mobile home may be 60 feet long, ten feet wide and weigh 30,000 pounds, and a dozen such units may be in various stages of completion in an assembly area. A conveyor system for use in such a facility should be inexpensive and should be simple to install and operate. The conveyor system should occupy very little of the working area and desirably should permit movement of individual units without disturbing other units positioned along the conveyor system. Alternatively, all units in process may be moved at the same time.

The more conventional conveyor systems utilize rollers, skids, platforms on wheels, and the like. Another form of conveyor system utilizing air cushion units is described in the co-pending application Ser. No. 151,318, filed June 9, 1971, now U.S. Pat. No. 3,757,931 entitled AUTOMATIC CONVEYOR SYSTEM FOR BUILDINGS AND THE LIKE, and assigned to the same assignee as the present application. In this earlier system, a plurality of parallel conveyor plates sit in the floor of an assembly area, with air cushion units mounted in the floor under the plates for raising the plates to engage and raise the loads from the floor. A drive unit is provided for each plate for translating the raised plates and loads in unison. After the plates and loads have been moved, the air cushion units are deflated, permitting lowering of the plates, leaving the loads in the new position, with the plates being returned to the initial position. Such a system requires a fixed set of air cushion units along the entire length of the conveyor system and also requires movement of all loads at one time.

In the conveyor system of the present invention, one or more tracks, each having one or more upstanding rails, are set on the floor of the assembly area. A plurality of independent load carriers are provided for moving along the tracks. Each load carrier includes a platform with a guide member engageable with the rail of the track, and one or more air cushion units removably mounted in the platform. In a typical installation, each load unit will rest on a pair of carriers, with each pair of carriers movable along the tracks independent of all other carriers.

The new conveyor system of the present application incorporates a number of advantages over the prior art systems and it is an object of the invention to provide such a new and improved conveyor system which will achieve these advantages. The new conveyor system may be installed directly on an existing floor or other surface and does not require any trenching or other surface preparation. The system can be fabricated by the manufacturer at his own plant and transported to the site in sections, ready for installation and use. The air cushion units need only be placed at the load points and the placing can be changed as desired depending upon the load requirements. Each load can be moved independent of all other loads and the power for the horizontal motion can be manual, tractor, winch, piston and cylinder, or otherwise as desired.

Other objects, advantages, features and results will more fully appear in the course of the following description. The drawings merely show and the description merely describes preferred embodiments of the present invention which are given by way of illustration or example.

In the drawings:

FIG. 3 is an enlarged plan view taken along the arrows 3—3 of FIG. 1, with the mobile home omitted;

FIG. 4 is an enlarged partial sectional view taken along line 4—4 of FIG. 3;

FIG. 7 is a view similar to that of FIG. 2 illustrating an alternative embodiment; and FIG. 8 is a view similar to that of FIG. 4 illustrating another alternative embodiment.

Figure 1:
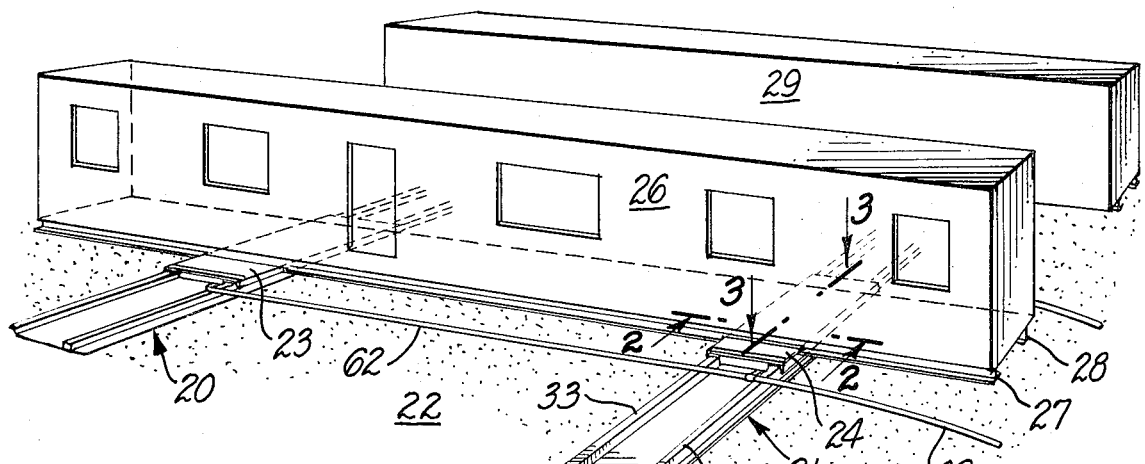
FIG. 1 is a perspective view illustrating a portion of a mobile home assembly area incorporating a presently preferred embodiment of the conveyor system of the invention.
Figure 2:
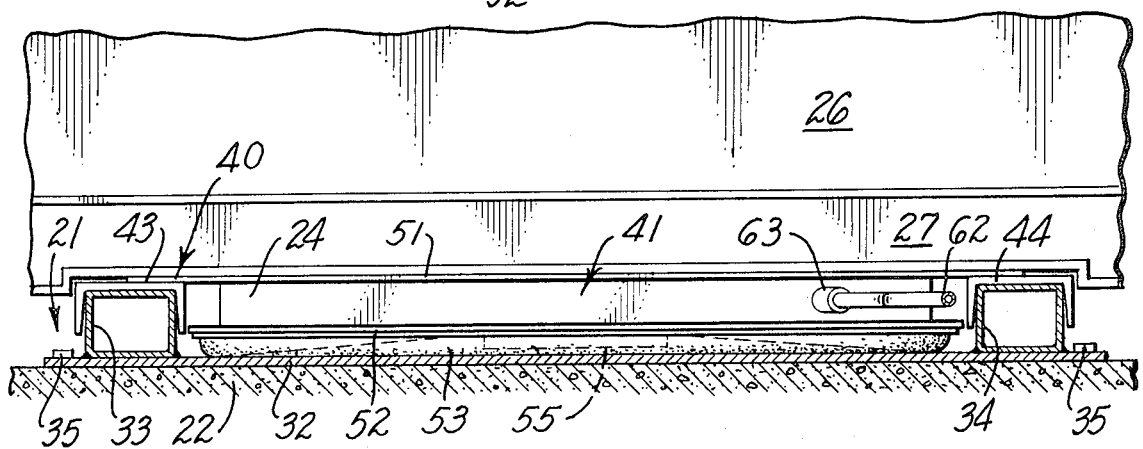
FIG. 2 is an enlarged partial sectional view taken along line 2—2 of FIG. 1.

Referring to FIG. 1, tracks 20, 21 are mounted on the floor 22 of a factory area. Load carriers 23, 24 are positioned on the tracks 20, 21, respectively. A typical load, such as a mobile home 26 rests on beams 27, 28 which in turn rest on the carriers 23, 24. Another mobile home 29 is seen behind the home 26, and rests on another pair of load carriers also positioned on the tracks 20, 21. Additional loads may be carried on additional carriers along the entire length of the tracks.

The tracks 20, 21 may be identical in construction and may comprise a plate 32 with parallel box beams 33, 34 affixed thereto. The plate 32 may be fixed to the floor 22 by anchor bolts 35 with the upper surface of the plate providing a smooth operating surface for the air cushion units. The box beams 33, 34 serve as upstanding rails for engaging guide members of the load carriers. The track is readily manufactured in sections after which it can be transported to the assembly area and fixed to the floor in the desired location. With this arrangement, any length of track and any number of parallel tracks can be installed. While the tracks are shown in the drawings resting on the floor, they may be recessed in the floor or the floor area around the tracks may be built up, if desired.

Figure 5:
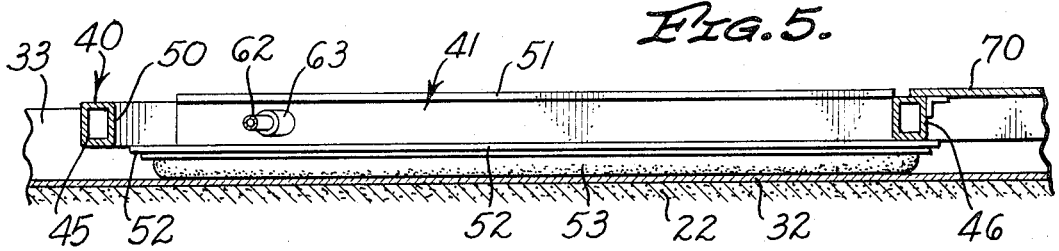
FIGS. 5 and 6 are views similar to that of FIG. 4, illustrating the removal of an air cushion unit.

Load carriers 23, 24 may be identical and each may comprise a platform 40 with a plurality of air cushion units 41 carried therein. The platform 40 as shown in FIGS. 3, 4 and 5, comprises a frame formed by channels 43, 44 and cross members 45, 46, 47, 48, 49. The channels 43, 44 rest on the rails 33, 34 of the track when the air supply is turned off. When the air supply is turned on, the air cushion units raise the platform and load, raising the channels upward from the rails, permitting the channels to serve as guides as the platform is moved along the track. While channels are preferred for use as the guides, other structural shapes can be utilized to provide the same guiding action.

The channels and cross members of the frame define four air cushion unit openings 50, each of which may receive one of the air cushion units. In the embodiment illustrated, an air cushion unit is positioned in each end opening, with the two inner openings vacant.

A typical air cushion unit is shown in FIG. 4 and comprises an upper member 51 fixed to an intermediate rigid plate member 52, with a resilient lower member 53 of circular configuration and fixed to the member 52 at the periphery by the ring 54 and at the center by plate 55 defining an annular space 60 therebetween. The members 51, 52 form an air chamber 56. Openings 59 in the lower resilient member 53 provide for air flow between the annular space 60 and the central zone 58 between the track plate 32 and the resilient member 53. Air may be supplied under pressure to the space 60 via a hose 62 and fitting 63. A passage 57 provides communication between the space 60 and the chamber 56.

Referring to FIG. 4, the air cushion unit opening extends between the cross members 45, 46. The intermediate plate 52 of the air cushion unit is made sufficiently long to extend under the cross members 45, 46 of the frame. The upper member 51 of the air cushion unit is made shorter, so that the air cushion unit can move horizontally within the opening in the frame. When the system is in use, a spacer 65 may be positioned between the member 51 and the member 46. Another spacer may be positioned between the member 51 and the member 45.

Figure 6:
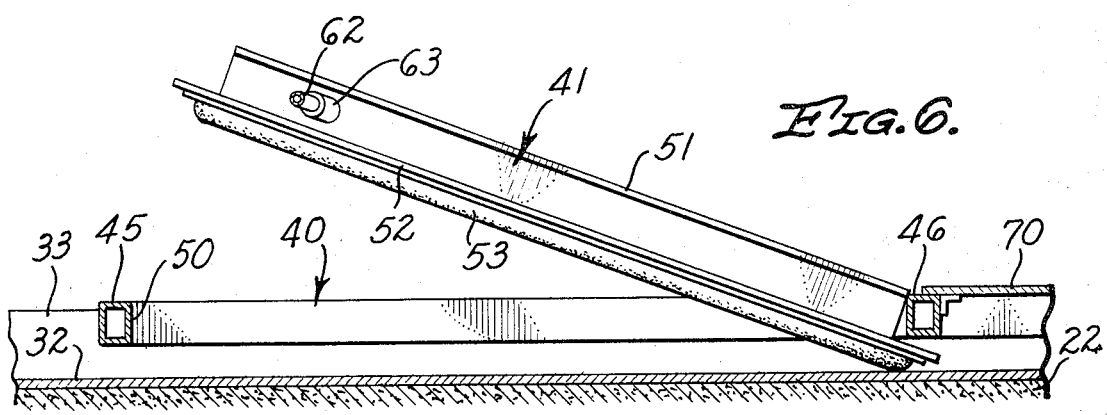

When the air supply is turned off, the platform rests on the rails. The spacers 65, 66 may be removed and the air cushion unit may be moved to one side, to the right as seen in FIG. 5. Intermediate plate 52 of the air cushion unit will now clear the cross member 45, permitting lifting of one side of the air cushion unit for removal upward through the opening 50 of the frame, as seen in FIG. 6. The air cushion unit may be inspected, repaired and replaced, or a new unit may be substituted, or the air cushion unit may be left out, as desired. With this construction, air cushion units may be installed and removed in any of the openings in the frame as dictated by the load anticipated.

It is preferred to have a smooth upper surface for each platform and in the embodiment illustrated, cover plates 70 are positioned at the frame openings which do not have air cushion units, with the cover plates being the same height as the upper members 51 of the air cushion units. Angles 71 may be carried on the cover plates for locating the cover plates in the openings. Preferably, the spacers 65, 66 are flush with the cover plates and in the embodiment illustrated, each spacer is formed of a channel member 72 with a small top plate 73.

In operation, a carrier is placed on a track, the desired number of air cushion units are installed, the spacers are installed and the cover plates are installed. Typically a similar carrier would be installed on the adjacent track. The carriers are then ready for application of the load. When it is desired to move the load along the tracks, the air hose is connected to supply air to each of the air cushion units. The resilient lower members 53 expand and raise the platforms and load, with the load now resting on the thin film of air flowing outward from the central space 58 to the surrounding atmosphere between the track plate 32 and the resilient member 53. When in this condition, the platforms with the load are readily moved longitudinally along the tracks to a new position. The moving force may be applied manually or by a tractor or winch or other mechanism as desired. A reciprocating drive system of the type shown in the aforementioned application Ser. No. 151,318, could be utilized. When the load is moved to the desired position, the air supply is shut off, the air cushions deflate and the platforms rest on the rails of the tracks. With this arrangement, each platform or group of platforms having a single load can be moved independently of all other platforms and loads in the assembly area. Alternatively, two or more carriers on a track may be coupled together for moving a plurality of loads at one time.

An alternative configuration utilizing a single rail is illustrated in FIG. 7 where elements corresponding to those of FIGS. 1–6 are identified by the same reference numerals. A box beam 80 may be positioned at the center of the plate 32 of the track to serve as a single upstanding rail. The frame of the platform may include a central channel 81 with cross members 82, 83 on each side, and with side rails 84, 85 completing the frame and defining air cushion unit openings on each side of the guide channel 81. The air cushion units 41 are insertable and removable in the same manner as in the first embodiment and the platforms are used in the same manner.

Another alternative configuration is illustrated in FIG. 8, where elements corresponding to those of the earlier described embodiments are identified by the same reference numerals. In this embodiment, the upper member of the air cushion unit 41 comprises upstanding flanges (typically angles) 90 carried on the intermediate plate 52, with the flanges 90 serving to position the air cushion unit in the frame opening. It will be readily seen that only one removable spacer is required in any of the embodiments, and a single spacer 91 is utilized in the embodiment of FIG. 8. The upper surface of the platform is made level by a cover 92 which may be similar to the covers 70. Other changes, modifications and substitutions may be made in the embodiments disclosed without necessarily departing from the spirit of the invention. By way of example, the tracks 20, 21 do not require the plates 32; instead, the upstanding rails may be mounted directly on the floor of the assembly area or other location in which the system is to be used. However, the smooth plate 32 is preferred since it provides a uniform, smooth and readily cleaned surface for operation of the air cushion units. The plate 32 also permits factory controlled spacing of the rails and provides a flange for ready installation of the track.

We claim:
1. In a conveyor system, the combination of:
track means defining a rail;
a platform movable along said track means and including a guide member engageable with said rail and a frame defining an air cushion unit opening;

at least one air cushion unit removably mounted in said platform; and
means for supplying air under pressure to said air cushion unit for lifting said platform from said track means;
said air cushion unit including an upper member positionable within said frame, an intermediate rigid member positionable below said frame, and a lower flexible member carried under said intermediate member and defining an air space therebetween, with said intermediate member engaging and lifting said platform when air under pressure is supplied to said air space.

2. In a conveyor system, the combination of:
track means defining a rail;

a platform movable along said track means and including a guide member engageable with said rail and a frame defining an air cushion unit opening;

at least one air cushion unit removably mounted in said platform; and means for supplying air under pressure to said air cushion unit for lifting said platform from said track means;

said air cushion unit including an upper member positionable within said frame, an intermediate rigid member positionable below said frame, and a lower flexible member carried under said intermediate member and defining an air space therebetween, with said intermediate member engaging and lifting said platform when air under pressure is supplied to said air space, with said intermediate member larger in a horizontal dimension than said opening and said upper member smaller than said opening in said horizontal dimension, with said air cushion unit movable longitudinally within said frame between a first position with said intermediate member engaging said platform at two spaced points in lifting relation, and a second position with said intermediate member clearing said platform at one of said points and tiltable for upward removal through said opening.

3. A system as defined in claim 2 including a spacer positioned between said upper member and said frame when said air cushion unit is in said first position preventing movement to said second position.

4. A system as defined in claim 2 wherein said upper and intermediate members define an air chamber therebetween, with the air under pressure supplied to said chamber, and including a passage for air flow from said chamber to the lower surface of said lower member.

5. A system as defined in claim 2 wherein said frame defines a plurality of said air cushion unit openings, with air cushion units positioned in selected openings.

6. A system as defined in claim 1 wherein said platform includes a frame defining a plurality of air cushion unit openings with air cushion units removably mounted in selected openings.

7. A system as defined in claim 6 wherein said guide member is centrally disposed along said platform with air cushion unit openings on each side thereof.

8. A system as defined in claim 6 wherein said guide member comprises a pair of spaced elements with said air cushion unit openings therebetween.

9. A system as defined in claim 1 wherein said track means includes an elongate horizontally disposed plate with said rail carried thereon, with said guide member resting on said rail and supporting said platform over said track means with the air supply off, and with said air cushion unit resting on an air film on said plate and supporting said platform over said track means with the air supply on.

10. A system as defined in claim 9 wherein said rail is centrally disposed along said plate and said guide member is centrally disposed along said platform.

11. A system as defined in claim 9 wherein said rail comprises a pair of spaced elements disposed along said plate and said guide member comprises a pair of spaced elements disposed along said platform.

12. A carrier for a conveyor system, including in combination:

a platform having a guide member engageable with a rail and a frame defining a plurality of air cushion unit openings; and a plurality of air cushion units removably mounted in selected openings of said frame; and means for supplying air under pressure to said air cushion units;

each of said air cushion units including an upper member positionable within said frame, an intermediate rigid member positioned below said frame, and a lower flexible member carried under said intermediate member and defining an air space therebetween, with said intermediate member engaging and lifting said platform when air under pressure is supplied to said air space.

13. A system as defined in claim 12 wherein said intermediate member is larger in a horizontal dimension than said opening and said upper member is smaller than said opening in said horizontal dimension, with said air cushion unit movable longitudinally within said frame between a first position with said intermediate member engaging said platform at two spaced points in lifting relation, and a second position with said intermediate member clearing said platform at one of said points and tiltable for upward removal through said opening.

* * * * *